US012170983B2

(12) United States Patent
Liu et al.

(10) Patent No.: US 12,170,983 B2
(45) Date of Patent: *Dec. 17, 2024

(54) METHOD AND DEVICE FOR INDICATING RESOURCE ALLOCATION

(71) Applicant: NEC CORPORATION, Tokyo (JP)

(72) Inventors: Hongmei Liu, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/561,174

(22) Filed: Dec. 23, 2021

(65) Prior Publication Data

US 2022/0124709 A1    Apr. 21, 2022

Related U.S. Application Data

(63) Continuation of application No. 16/475,820, filed as application No. PCT/CN2017/070239 on Jan. 5, 2017, now Pat. No. 11,240,799.

(51) Int. Cl.
*H04W 72/0446* (2023.01)
*H04W 72/12* (2023.01)
*H04W 72/23* (2023.01)

(52) U.S. Cl.
CPC ....... *H04W 72/0446* (2013.01); *H04W 72/12* (2013.01)

(58) Field of Classification Search
CPC ......... H04W 72/0446; H04W 72/1205; H04W 72/1289
See application file for complete search history.

(56) References Cited

U.S. PATENT DOCUMENTS

| 10,499,382 | B2 | 12/2019 | Dinan |
| 11,240,799 | B2* | 2/2022 | Liu ................... H04W 72/0446 |
| 2011/0086657 | A1 | 4/2011 | Koivisto et al. |
| 2011/0150108 | A1 | 6/2011 | Chae et al. |
| 2014/0044063 | A1 | 2/2014 | Lim et al. |
| 2014/0092792 | A1 | 4/2014 | Kim et al. |
| 2014/0112289 | A1 | 4/2014 | Kim et al. |

(Continued)

FOREIGN PATENT DOCUMENTS

| CN | 103329496 A | 9/2013 |
| CN | 104348579 A | 2/2015 |

(Continued)

OTHER PUBLICATIONS

Panasonic, "Scheduling considerations for dynamic resource sharing among numerologies in NR", 3GPP TSG-RAN WG1 Meeting #87, Nov. 14-18, 2016, Reno, USA, R1-1612798 (5 pages total).

(Continued)

*Primary Examiner* — Harry H Kim
(74) *Attorney, Agent, or Firm* — Sughrue Mion, PLLC

(57) ABSTRACT

Embodiments of the disclosure provide a method and device for indicating time domain resource allocation. The method comprises: determining time information of a resource region based on numerology information of the resource region, the resource region being allocated for transmitting data to a terminal device; and transmitting the time information to the terminal device to enable the terminal device to receive the data on the resource region.

7 Claims, 3 Drawing Sheets

(56) References Cited

U.S. PATENT DOCUMENTS

| | | | |
|---|---|---|---|
| 2014/0146768 A1* | 5/2014 | Seo | H04L 27/2601 370/329 |
| 2014/0348091 A1 | 11/2014 | Seo et al. | |
| 2015/0208392 A1 | 7/2015 | Park et al. | |
| 2015/0215906 A1 | 7/2015 | Park et al. | |
| 2016/0143008 A1 | 5/2016 | Lee et al. | |
| 2017/0086172 A1 | 3/2017 | Dinan | |
| 2017/0111888 A1 | 4/2017 | Dinan | |
| 2017/0164407 A1 | 6/2017 | Yang et al. | |
| 2017/0366377 A1* | 12/2017 | Papasakellariou | H04L 5/0053 |
| 2018/0359751 A1* | 12/2018 | Ko | H04L 5/0092 |
| 2019/0132854 A1* | 5/2019 | Nakamura | H04W 72/569 |
| 2019/0182012 A1* | 6/2019 | Liu | H04W 72/04 |
| 2019/0215816 A1* | 7/2019 | Tang | H04L 5/0007 |
| 2019/0327066 A1* | 10/2019 | Gao | H04L 5/0044 |
| 2020/0067675 A1* | 2/2020 | Takeda | H04L 5/0053 |
| 2020/0137751 A1* | 4/2020 | Nam | H04W 74/006 |
| 2020/0204305 A1* | 6/2020 | Stern-Berkowitz | H04L 1/1692 |
| 2020/0336249 A1* | 10/2020 | Yi | H04W 72/23 |
| 2021/0212057 A1* | 7/2021 | Takano | H04W 72/0446 |
| 2022/0150875 A1* | 5/2022 | Bala | H04W 72/541 |

FOREIGN PATENT DOCUMENTS

| | | |
|---|---|---|
| CN | 105099634 A | 11/2015 |
| JP | 2013-243460 A | 12/2013 |
| WO | 2010/150512 A1 | 12/2010 |
| WO | 2013/027926 A1 | 2/2013 |
| WO | 2016/105126 A1 | 6/2016 |
| WO | 2016/130175 A1 | 8/2016 |
| WO | 2016/137532 A1 | 9/2016 |

OTHER PUBLICATIONS

ETRI, "Frequency domain NR frame structure", 3GPP TSG RAN WG1 Meeting #86BIS, Oct. 10-14, 2016, Lisbon, Portugal, R1-1609391 (4 pages total).
Communication dated Apr. 26, 2022 from the Japanese Patent Office in Application No. 2021-082433.
Communication dated Sep. 23, 2022 from The State Intellectual Property Office of P.R. Republic of China in Application No. 201780082286.4.
CATT, "NR Time domain structure: slot and mini-slot and time interval", 3GPP TSG RAN WG1 Meeting #87, Reno, NV, USA Nov. 14-18, 2016, R1-1611366, 5 pages total.
Ericsson, "On mini-slots", TSG-RAN WG1 #87, Reno, NV, USA, Nov. 14-18, 2016, R1-1612904, 2 pages total.
Ericsson, "Summary of e-mail discussion on downlink control signaling", 3GPP TSG-RAN EG#149b R1-073051, 3GPP, Orlando, Jun. 25-29, 2007, pp. 2-4E.
ETRI, "Discussion on the subcarrier spacing selection for NR", 3GPP TSG-RAN WG1 Meeting #86, R1-1609608, 3GPP, Lisbon, Portugal Oct. 10-14, 2016, pp. 1-9 (10 pages).
Huawei et al., "Control signaling enhancements for short TTI", 3GPP TSG RAN WG1 meeting #83, R1-156461, Anaheim, USA, Nov. 15-22, 2015 ( 8 pages total).
Huawei et al., "PDCCH design for short TTI", 3GPP TSG RAN WG1 Meeting #84bis, R1-162109, Busan, Korea, Apr. 11-15, 2016 (6 pages total).
Huawei et al., "Short TTI for DL transmission", 3GPP TSG RAN WG1 Meeting #84, R1-160292, St. Julian's, Malta, Feb. 15-19, 2016 (9 pages total).
Huawei, HiSilicon, "Downlink resource allocation for B5C", 3GPP TSG-RAN WG1 Meeting #80bis, R1-151856, 3GPP, Belgrade, Serbia, Apr. 20-24, 2015, 5 pages.
International Search Report for PCT/CN2017/070239 dated Aug. 24, 2017 [PCT/ISA/210].
MediaTek, Inc., "Discussion on resource allocation of NB-PUSCH", 3GPP TSG-RAN WG1 Meeting #84, R1-160774, 3GPP, St. Julian's, Malta, Feb. 15-19, 2016, pp. 1-6 (7 pages).
Nokia Networks, "Basic system design for UL NB-IoT", 3GPP TSG-RAN WG1 NB-IoT Adhoc, R1-160041, 3GPP, Budapest, Hungary, Jan. 18-20, 2016, 3 pages.
Notification of Reasons for Refusal dated Mar. 17, 2020 from the Japanese Patent Office in application No. 2019-536844.
Notification of Reasons for Refusal dated Sep. 29, 2020 from the Japanese Patent Office in Application No. 2019-536844.
Office Action issued Feb. 16, 2021 in Japanese Application No. 2019-536844.
Panasonic, "Indication of combination between L1/L2 control signaling and uplink data", 3GPP TSG-RAN WG1 Meeting#44bis, R1-060793, 3GPP, Athens, Greece, Mar. 27-31, 2006, pp. 1-3 (4 pages).
Samsung, "Discussion on numerology aspects of NR synchronization sign al", 3GPP TSG-RAN WG1 Meeting #86 R1-166795, 3GPP, Gothenburg, Sweden, Aug. 22-26, 2016, pp. 1-5 (6 pages).

* cited by examiner

METHOD AND DEVICE FOR INDICATING RESOURCE ALLOCATION

CROSS REFERENCE TO RELATED APPLICATIONS

This application is a continuation of U.S. application Ser. No. 16/475,820, filed on Jul. 3, 2019, which is a National Stage of International Application No. PCT/CN2017/070239, filed on Jan. 5, 2017, the contents of which are incorporated by reference herein in their entireties.

FIELD OF THE INVENTION

Embodiments of the present disclosure generally relate to communication techniques. More particularly, embodiments of the present disclosure relate to a method and device for indicating resource allocation.

BACKGROUND OF THE INVENTION

Newly-developed mobile standards call for higher data transfer speeds, greater numbers of connections, and better coverage, among other improvements. Generally, a network device transmits data on allocated resource to one or more terminal devices. In a legacy Long Term Evolution (LTE) system, a subframe is used as a scheduling granularity of the time domain resource allocation. In a 5G system, such as New Radio (NR), a mini-slot is introduced as the scheduling granularity, for example, for Ultra-reliable low latency communication (URLLC) traffic. A mini-slot may include one or more symbols and the length of the mini-slot may change semi-statically or dynamically. In such a case, the scheduling granularity is variable.

In NR, the numerology may change from one subframe to another subframe due to different traffic requirements, which makes the time domain resource granularity length change. For carriers having different numerologies, cross carrier scheduling also needs to take the different time domain resource granularities into account.

In these cases, time domain resource allocation needs to consider different scheduling granularities and dynamically change numerology within the same carrier or different carriers. However, conventional schemes do not provide a solution for indicating the time domain resource allocation under such circumstances.

Accordingly, there is a need to develop a scheme for indicating information about time domain resource allocation in case of variable scheduling granularities.

SUMMARY OF THE INVENTION

The present disclosure proposes a solution for indicating time domain resource allocation.

According to a first aspect of embodiments of the present disclosure, embodiments of the present disclosure provide a method performed by a network device. The network device determines time information of a resource region based on numerology information of the resource region. The resource region is allocated for transmitting data to a terminal device. Then the network device transmits the time information to the terminal device to enable the terminal device to receive the data on the resource region.

According to a second aspect of embodiments of the present disclosure, embodiments of the present disclosure provide method performed by a terminal device. The terminal device receives time information of a resource region from a network device. The resource region is allocated for transmitting data to the terminal device. The time information is determined based on numerology information of the resource region. Then, the terminal device receives the data on the resource region based on the time information.

According to a third aspect of embodiments of the present disclosure, embodiments of the disclosure provide a network device. The network device comprises: a controller configured to determine time information of a resource region based on numerology information of the resource region, the resource region being allocated for transmitting data to a terminal device; and a transmitter configured to transmit the time information to the terminal device to enable the terminal device to receive the data on the resource region.

According to a fourth aspect of embodiments of the present disclosure, embodiments of the disclosure provide a terminal device. The terminal device comprises: a receiver configured to receive time information of a resource region from a network device, the resource region being allocated for transmitting data to the terminal device, and the time information being determined based on numerology information of the resource region; and receive the data on the resource region based on the time information.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Embodiments of the disclosure are presented in the sense of examples and their advantages are explained in greater detail below, with reference to the accompanying drawings, where.

Throughout the figures, same or similar reference numbers indicate same or similar elements.

DETAILED DESCRIPTION OF EMBODIMENTS

Figure 1:
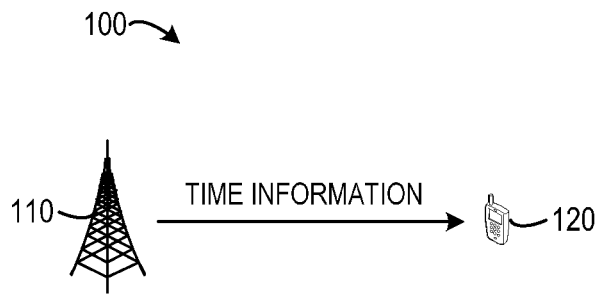
FIG. 1 illustrates a schematic diagram of a communication system 100 according to embodiments of the present disclosure.

The subject matter described herein will now be discussed with reference to several example embodiments. It should be understood these embodiments are discussed only for the purpose of enabling those skilled persons in the art to better understand and thus implement the subject matter described herein, rather than suggesting any limitations on the scope of the subject matter.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two functions or acts shown in succession may in fact be executed concurrently or may sometimes be executed in the reverse order, depending upon the functionality/acts involved.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future.

Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

The term "network device" includes, but not limited to, a base station (BS), a gateway, a management entity, and other suitable device in a communication system. The term "base station" or "BS" represents a node B (NodeB or NB), an evolved NodeB (eNodeB or eNB), a Remote Radio Unit (RRU), a radio header (RH), a remote radio head (RRH), a relay, a low power node such as a femto, a pico, and so forth.

The term "terminal device" includes, but not limited to, "user equipment (UE)" and other suitable end device capable of communicating with the network device. By way of example, the "terminal device" may refer to a terminal, a Mobile Terminal (MT), a Subscriber Station (SS), a Portable Subscriber Station, a Mobile Station (MS), or an Access Terminal (AT).

Now some exemplary embodiments of the present disclosure will be described below with reference to the figures. Reference is first made to FIG. 1, which illustrates schematic diagram of a communication system 100 according to embodiments of the present disclosure.

In the communication system 100, there illustrate a network device (for example, an eNB) 110 that communicates with a terminal device (for example, a UE) 120. To transmit data to the terminal device 120, the network device 110 allocates a resource region to the data transmission, and determines time information of the resource region based on numerology information of the resource region. Then, the network device 110 sends the time information of the resource region to the terminal device 120. As such, the terminal device 120 is enabled to receive the data on the resource region based on the time information.

In the context of the present disclosure, the term "numerology" refers to a set of parameters. In an Orthogonal Frequency Division Multiplexing (OFDM)-based system, the parameters include, for example, but not limited to, a subcarrier spacing, a symbol length, a length of a cyclic prefix (CP), and so on. For instance, a numerology for a subcarrier spacing of 15 KHz may include 14 symbols in one millisecond, a normal CP, and so on. A numerology for a subcarrier spacing of 30 KHz may include 28 symbols in one millisecond, a normal CP, and so on. Such a numerology is different from the numerology for the subcarrier spacing of 15 KHz.

The term "resource region" refers to a block of time-frequency resource allocated by the network device 110 for use in data transmission to the terminal device. The time information of the resource region may be indexed by one or more scheduling units. The scheduling units may be different depending on different numerologies used by a resource region. A scheduling unit may be the smallest possible scheduling granularity.

Figure 2:
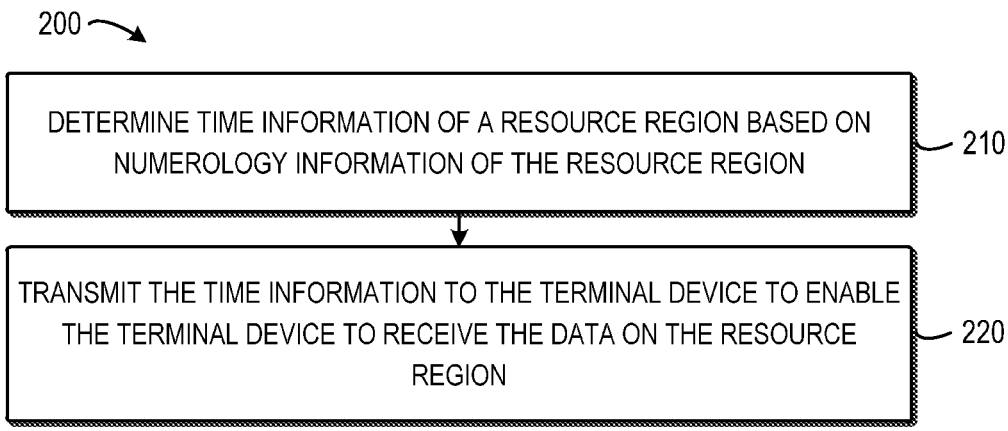
FIG. 2 illustrates a flow chart of a method 200 for indicating resource allocation according to embodiments of the present disclosure.

Now some exemplary embodiments of the present disclosure will be described below with reference to the following figures. FIG. 2 illustrates a flow chart of a method 200 for indicating resource allocation according to embodiments of the present disclosure. The method 200 may be implemented by the network device 110, for example, an eNB or other suitable device.

The method 200 is entered at 210, where the network device 110 determines time information of a resource region based on numerology information of the resource region. The resource region is allocated for transmitting data to a terminal device.

According to embodiments of the present disclosure, the time information of the resource region may be determined in a variety of ways. In some embodiments, a scheduling unit may be determined based on a largest numerology used by one or more resource regions allocated by the network device 110. The largest numerology indicates a numerology with largest subcarrier spacing. Then, the time information may be determined based on the scheduling unit.

The time information indicates the time domain positions of the resource region and may be represented by a starting position, an ending position, the length of the resource region, and/or the like. In some embodiments, the length may be determined by the starting position and the ending position. Thus, two or more of the starting position, the ending position, the length of the resource region may be used to indicate the time domain positions of the resource region allocated to the terminal device 120. At 210, the network device 110 may determine the time information by performing at least two of: determining a starting scheduling unit of the resource region as the starting position of the resource region; determining an ending scheduling unit of the resource region as the ending position of the resource region; and determining a number of scheduling units occupied by the resource region as the length of the resource region.

In the above embodiments, information about numerologies used by one or more resource regions allocated by the network device may be predefined at both the network device 110 and the terminal device 120 sides, for example, according to specification definition, system requirements, and so on. Alternatively, this information may be provided by the network device 110 to the terminal device 120 via high level signaling, such as a Radio Resource Control (RRC) signaling. Upon receipt of the time information of the resource region, the terminal device 120 may determine the starting scheduling unit, the ending scheduling unit and the number of scheduling units occupied by the resource region as the start position, the end position and the length of the resource region, respectively. In this way, the terminal device 120 can determine the time domain resource allocation for the data to be received from the network device 110. More details of the embodiments will be discussed with respect to FIG. 3.

Alternatively, in some embodiments, the network device 110 may determine the time information based on both a scheduling unit and a reference unit. The scheduling unit may be determined based on the numerology information of the resource region. The network device 110 may transmit the numerology information of the resource region to the terminal device 120, such that the terminal device 120 may determine the scheduling unit based on the numerology information of the resource region.

The reference unit may be determined based on a predetermined numerology. The predetermined numerology may be predefined at both the network device 110 and the terminal device 120 sides, for example, according to specification definition, system requirements, and so on. Alternatively, the network device 110 may predetermine the numerology, and send information about the predetermined numerology to the terminal device 120 via a high level signaling, such as a RRC signaling. As a further alternative, the network device 110 may determine the reference unit based on the predetermined numerology, and send information about the reference unit to the terminal device 120 via the RRC signaling.

In the embodiments, the time information may include a first portion and a second portion. The first portion of the time information may be determined based on the reference unit, and then the second portion of the time information may be determined based on the first portion of the time information, the reference unit and the scheduling unit.

The first portion of the time information may include a first starting position indicating a coarse-grain starting position of the resource region, a first ending position indicating a coarse-grain ending position of the resource region, a first length of the resource region, and the like. In an example, in the determination of the first position of the time information, the network device 110 may perform at least two of the following: determining the starting reference unit of the resource region as the first starting position of the resource region; determining an ending reference unit of the resource region as the first ending position of the resource region; and determining a number of reference units occupied by the resource region as the first length of the resource region.

The second portion of the time information may include a second starting position of the resource region indicating a fine-grain starting position of the resource region, a second ending position indicating a fine-grain ending position of the resource region, and the like. In an example, in the determination of the second position of the time information, the network device 110 may determine the starting scheduling unit in the starting reference unit as the second starting position of the resource region, and determines the ending scheduling unit in the ending reference unit as the second ending position of the resource region.

In these embodiments, upon receipt of the first portion and the second portion of the time information of the resource region, the terminal device 120 may know the coarse-grain starting position, the coarse-grain ending position, and the coarse-grain length, and thus may determine in which reference unit(s) the resource region is located in. Then, the terminal device 120 may determine the starting scheduling unit in a reference unit (also referring to the "starting reference unit") and the ending scheduling unit in the same or a different reference unit (also referring to the "ending reference unit") based on the fine-grain starting and end positions. In this way, the terminal device 120 can determine the time domain resource allocation for the data to be received from the network device 110. More details of the above embodiments will be discussed with respect to FIG. 4.

As a further alternative, in some embodiments, at 210, the network device 110 may determine a scheduling unit based on the numerology information of the resource region. In other words, the scheduling unit discussed in these embodiments is associated with the numerology of the resource allocated to the terminal device 120, without considering numerologies of other possible resources. Then, the network device 120 may determine the time information based on the scheduling unit. In this case, the network device 110 may perform at least two of: determining a starting scheduling unit of the resource region as a starting position of the resource region; determining an ending scheduling unit of the resource region as an ending position of the resource region; and determining a number of scheduling units occupied by the resource region as a length of the resource region. In these embodiments, the network device 110 may transmit the numerology information of the resource region to the terminal device 120, such that the terminal device 120 may determine the scheduling unit based on the numerology information of the resource region.

Upon receipt of the time information of the resource region, the terminal device 120 may determine the starting scheduling unit, the ending scheduling unit and the number of scheduling units occupied by the resource region as the start position, the end position and the length of the resource region, respectively. In this way, the terminal device 120 may determine the time domain resource allocation for the data to be received from the network device 110. More details of the embodiments will be discussed with respect to FIG. 5.

Still referring to embodiments of method 200, at 220, the network device 110 transmits the time information to the terminal device 120 to enable the terminal device 120 to receive the data on the resource region. Specifically, upon receipt of the time information, the terminal device 120 may determine the time domain resource used by data transmission from the network device 110. As such, the terminal device 120 may receive the data on the resource region based on the time information of the resource region.

In addition, in some embodiments, indicating the time information of the resource region as discussed above may be used for self-scheduling as well as cross carrier scheduling. In some embodiments, a separate Downlink Control Information (DCI) for resource allocation may be used, and one or more terminal devices may decode the resource allocation information. In some embodiments, Demodulation reference signal (DMRS) configuration may be independently configured from the resource allocation. DMRS may be based on the subframe, slot, symbol or frame structure of a numerology. It can be configured semi-statically by RRC signaling or dynamically by DCI from forward compatibility perspective. If indicated by DCI, the signaling may indicate the DMRS existence and positions in current duration. The duration may be one or more symbols, slots, subframes, frames, and so on.

Figure 3:
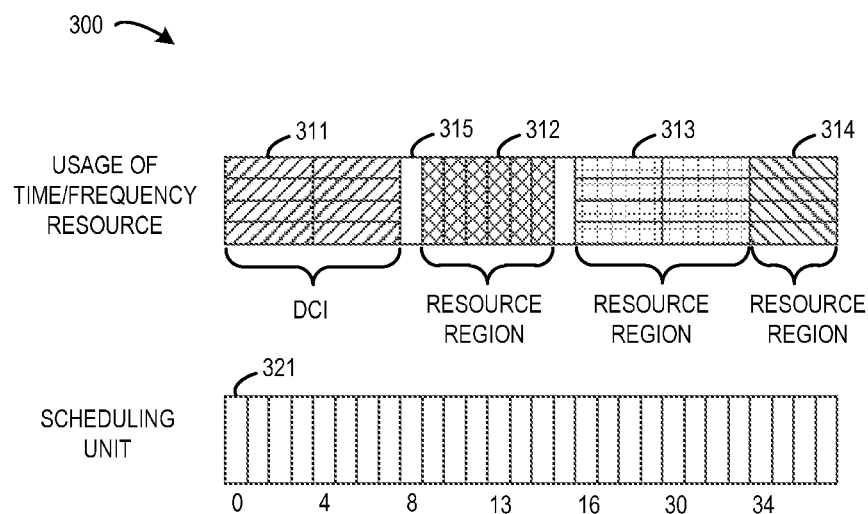
FIG. 3 illustrates a diagram 300 of time domain resource allocation indication according to embodiments of the present disclosure.

Now more embodiments of the present disclosure will be described below with reference to FIGS. 3-5. FIG. 3 illustrates a diagram 300 of time domain resource allocation indication according to embodiments of the present disclosure. The time-frequency resource includes four resource regions 311 to 314. The resource region 311 is allocated to DCI transmission, the resource regions 312, 313 and 314 are allocated to data transmission to terminal devices. The scheduling unit 321 is defined as the smallest possible scheduling granularity, and may be also referred to as a "symbol". It is to be understood that the term "symbol" used herein may be the same as or different from the legacy definition of "symbol" in LTE. In fact, the term "symbol" refers to a scheduling unit in the present disclosure. The size of the scheduling unit and indexing of the scheduling unit may be based on the smallest symbol length. For example, the size of the scheduling unit may be 1 symbol of the 60 KHz subcarrier spacing. In such a case, the resource regions 312 to 314 may be indexed as follows. The resource region 312, also referred to as "Downlink (DL) mini-slot 1," may be indicated by symbol 9-14. The resource region 313, also referred to as "DL mini-slot 2," may be indicated by symbol 16-23. The resource region 314, also referred to as "DL mini-slot 3," may be indicated by symbol 24-27.

It is to be understood that the above examples are described for illustration, rather than limitation. Those skilled in the art would readily understand that the size of the scheduling unit can also be other applicable values, such as 1 symbol of the 15 KHz subcarrier spacing. In such a case, all the scheduled time domain resources are multiples of the scheduling unit, but DL mini-slot 1 is not applicable. In this way, the payload size used to index different scheduling unit can be reduced.

In some embodiments, a resource region may be not immediately after or before another resource region. For example, there may be a gap 315 between DCI and DL mini-slot 1. The gap 315 may be used for DL/uplink (UL) transition, LBT for unlicensed spectrum, scheduling requirements, and/or other possible factors.

In the example of FIG. 3, for the resource region 312, at least two of a starting position 9, an ending position 14 and a duration length 6 may be transmitted as the time information to the terminal device 120. The start position 9 indicates that the starting position of the resource region 312 is the $9^{th}$ scheduling unit. The ending position 14 indicates that the ending position of the resource region 312 is the $14^{th}$ scheduling unit. The duration length 6 indicates that the resource region 312 occupies 6 scheduling units. In an embodiment, the time information of the DL mini-slot 1 may include the starting position 9 and the ending position 14. In another embodiment, the time information of the DL mini-slot 1 may include the starting position 9 and the duration length 6. In still another embodiment, the time information of the DL mini-slot 1 may include the ending position 14 and the duration length 6.

Still referring to the example of FIG. 3, for the resource region 313, the time information may include two of starting position 16, ending position 23 and duration length 8. For resource region 314, the time information may include two of starting position 24, ending position 27 and duration length 4.

In some embodiments, to support multi-slot time domain resource allocation, a longer duration length may be used. In addition, or alternatively, a larger ending position symbol index may be used. In addition, or alternatively, a slot/subframe/frame index in addition to the symbol index may be used to indicate the ending position more efficiently.

Figure 4:
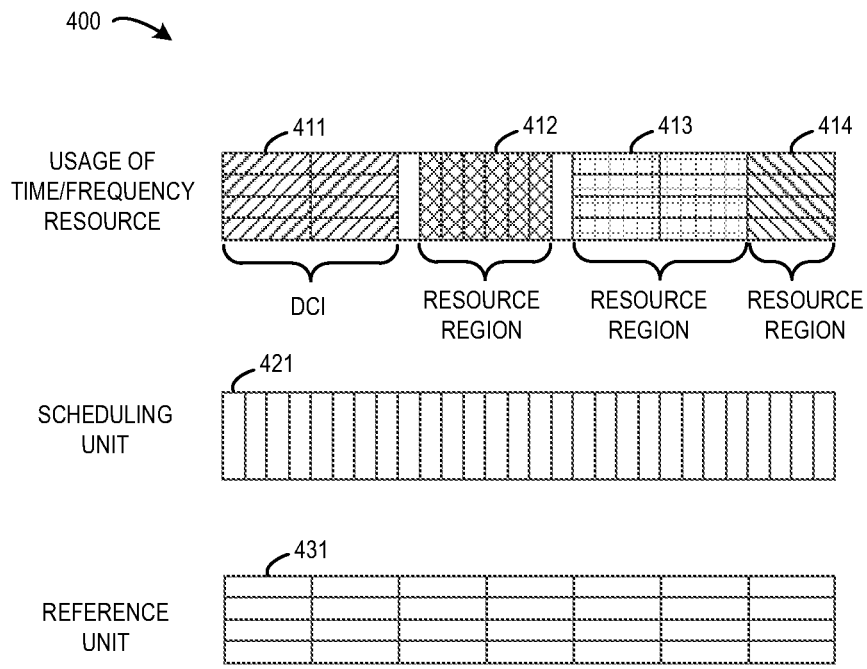
FIG. 4 illustrates a diagram 400 of time domain resource allocation indication according to further embodiments of the present disclosure.

FIG. 4 illustrates a diagram 400 of time domain resource allocation indication according to further embodiments of the present disclosure. In this example, the time information includes a first portion and a second portion. The first position is determined based on a reference unit (for example, the largest symbol length or other suitable predetermined symbol length). The second portion is determined based on a scheduling unit. In some embodiments, at least two of a starting reference unit, an ending reference unit and the total number of the reference unit(s) may be determined first. Then, resource allocation within a reference unit may be determined from the starting reference unit and the ending reference unit.

In the example of FIG. 4, the time-frequency resource includes four resource regions 411 to 414. The resource region 411 is allocated to DCI transmission, the resource regions 412, 413 and 414 are allocated to data transmission to terminal devices. The scheduling unit 421 may be determined based on the numerology information of a resource region, and the reference unit 431 may be determined based on a predetermined numerology.

At the side of the network device 110, regarding the resource region 412, two of starting symbol 2, ending symbol 3 and total symbol number 2 may be used as the first portion of the time information. Next, based on symbol length of the 60 KHz subcarrier spacing, starting symbol 1 and ending symbol 3 may be used as the second portion of the time information. At the side of the terminal device 120, it will know the time domain resource allocation starts from symbol 2 and ends at symbol 3 based on the 15 KHz subcarrier spacing. Next, the terminal device 120 may first divide a 15 KHz subcarrier spacing symbol into four 60 KHz subcarrier spacing symbols. Then, for the starting, the terminal device 120 may know that symbol 1 of the four 60 KHz symbols within symbol 2 of the 15 KHz subcarrier spacing is the starting position. For the ending, the terminal device 120 may know symbol 3 of the four 60 KHz symbols within the symbol 3 of 15 KHz subcarrier spacing is the ending position.

Regarding the resource region 413, at the network device 110, the first portion of the time information may include at least two of starting symbol 4, ending symbol 5 and duration length 2 that are determined based on 15 KHz subcarrier spacing. The duration length unit is also symbol with 15 KHz subcarrier spacing. Then, the network device 110 may determine that the time domain resource allocation specific numerology is the same as the reference numerology, so the second portion of the time information is unnecessary. As an alternative, the second portion may be the same as the first portion of the time information. At the terminal device 120, it may know the starting symbol 4 and ending symbol 5 if the time domain resource allocation unit is based on 15 KHz subcarrier spacing. Then, the terminal device 120 may know there is no fine granularity of time domain resource allocation, and the first portion of the time information is enough for determining the time domain resource allocation.

In the example of FIG. 4, the time information of the resource region 414 is similar to that of the resource region 413. The only difference may be that UL transmission may be indicated other than DL transmission.

In some embodiments, for multi-slot time domain resource allocation, a longer duration length and/or a larger ending position symbol index may be used. A slot/subframe/ frame index in addition to a symbol index may be used to indicate the ending position more efficiently.

Figure 5:
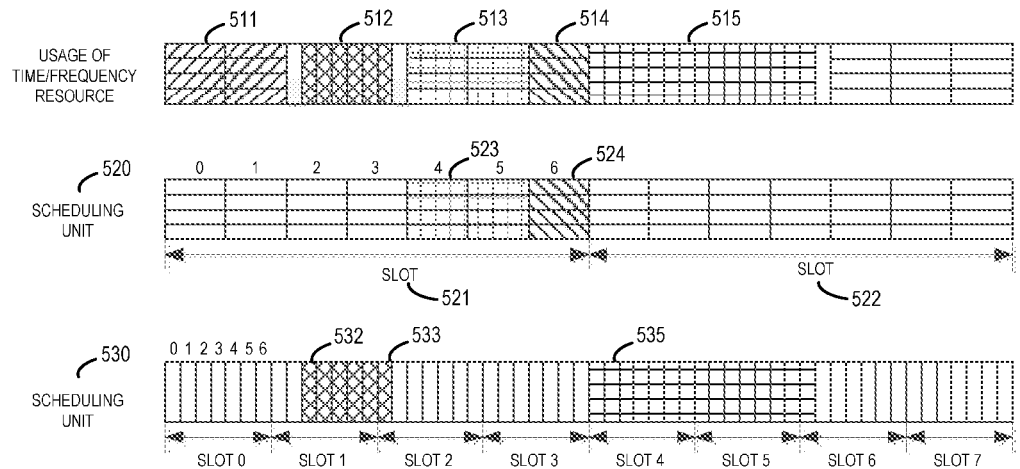
FIG. 5 illustrates a diagram 500 of time domain resource allocation indication according to still further embodiments of the present disclosure.

FIG. 5 illustrates a diagram 500 of time domain resource allocation indication according to still further embodiments of the present disclosure. The time-frequency resource includes five resource regions 511 to 515. The resource region 511 is allocated to DCI transmission, the resource regions 512, 513, 514 and 515 are allocated to data transmission to terminal devices. The scheduling units 523, 524, 532 and 535 may be determined based on the numerology information of resource regions 513, 514, 512 and 515, respectively. The scheduling unit may be a subframe, a slot, a mini-slot, or the like. The network device 110 may coordinate the resource allocation for different terminal devices and/or different numerologies.

According to embodiments of the present disclosure, the term "slot" or "indexing duration" is a time duration including a plurality of scheduling units. In the example of FIG. 5, in case of the subcarrier spacing 15 KHz, a slot 521 or 522 includes 7 scheduling units 520, namely, 7 symbols. In case of the subcarrier spacing 60 KHz, slot 0 to 7 each includes 7 scheduling units 530. In other words, there are 2 slots 521 and 522 for 15 KHz subcarrier spacing and 8 slots for 60 KHz subcarrier spacing. There may be indices 0,1,2,3,4,5,6 for indexing 7 symbols within one slot. In the example of FIG. 5, a 15 KHz slot contains four 60 KHz slots. Physical downlink control channel (PDCCH)/Enhanced physical downlink control channel (ePDCCH) monitoring may be per slot per numerology. There may be 4 monitoring occasions for 60 KHz subcarrier spacing within a slot of 15 KHz.

In some embodiments, to support multi-slot time domain resource allocation, a longer duration length and/or a longer ending position symbol index may be used. A slot/subframe/frame index in addition to symbol index can be used to indicate the ending position more efficiently.

Still referring the example of FIG. 5, the subcarrier spacing of the resource region 512 is 60 kHz, thus the scheduling unit 530 is used for indicating the time information of the resource region 512. The time information may include at least two of: the starting symbol 532, the ending symbol 533 and a length in terms of symbols, namely, 6 symbols in this example. In some embodiments, the starting symbol may be indicated by a global index of the starting symbol. It is to be understood that this is an example, rather than limitation. In an alternative embodiment, the starting symbol may be indicated by a slot (for example, slot 1) in which the staring symbol locates together with the index of the starting symbol (for example, symbol 2 of slot 1) in the slot.

Regarding the resource region 513, the subcarrier spacing thereof is 15 kHz, thus the scheduling unit 520 is used for indicating the time information of the resource region 513. This time information may include at least two of a slot length 1, a starting symbol 4, and an ending symbol 5, wherein the slot length 1 indicates the span of the resource region 513 is within one slot 521, namely, a single slot resource allocation. The starting symbol 4 indicates that the resource region 513 starts at symbol 4 of slot 521, and the ending symbol 5 indicates that the resource region 513 ends at symbol 5 of slot 521.

Regarding the resource region 514, the subcarrier spacing is also 15 kHz. Thus, the scheduling unit 520 is also used for indicating the time information. In the example, the time information of the resource region 514 may include the slot length 1, the starting symbol 6 and the ending symbol 6. If the resource region is allocated for uplink transmission, then the uplink transmission direction also needs to be indicated to the terminal device 120.

Regarding the resource region 515, the subcarrier spacing is also 60 kHz. Thus, the scheduling unit 530 is used for indicating the time information. In the example, the time information of the resource region 515 may include the slot length 3, the starting symbol 0 and the ending symbol 0. The slot length 3 indicates that the resource allocation 515 occupies 3 slots.

In the aforesaid embodiments, the numerology, such as 15 KHz or 60 KHz subcarrier spacing may be indicated from the network device 110 to the terminal device 120. As such, the terminal device 120 can determine a corresponding scheduling unit for different resource regions.

Figure 6:
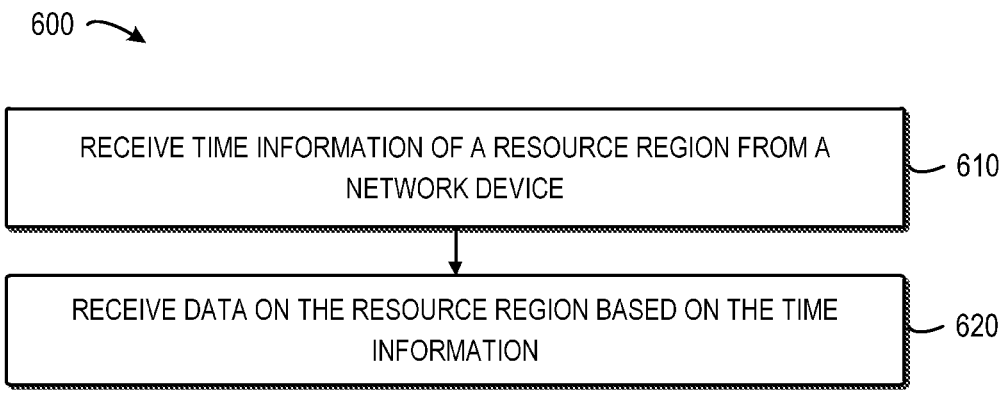
FIG. 6 illustrates a flow chart of a method 600 for indicating resource allocation according to embodiments of the present disclosure.

Reference is now made to FIG. 6, which illustrates a flow chart of a method 600 for indicating resource allocation according to embodiments of the present disclosure. The method 600 may be implemented by the terminal device 120, for example, a UE or other suitable device.

The method 600 is entered at 610, where the terminal device 120 receives time information of a resource region from the network device 110. The resource region is allocated for transmitting data to the terminal device, and the time information is determined based on numerology information of the resource region. Then, at 620, the terminal device 120 receives the data on the resource region based on the time information.

According to embodiments of the present disclosure, there may be a plurality of ways for receiving the time information. In some embodiments, the terminal device 120 may receive at least two of: a starting scheduling unit of the resource region, an ending scheduling unit of the resource region, and a number of scheduling units occupied by the resource region. The scheduling unit may be determined based on a largest numerology used by one or more resource regions allocated by the network device 110.

In some alternative embodiments, the terminal device 120 may receive a first portion and a second portion of the time information. The first portion of the time information may include at least two of: a starting reference unit of the resource region, an ending reference unit of the resource region, and a number of reference units occupied by the resource region. The second portion of the time information may include a starting scheduling unit and an ending scheduling unit. The scheduling unit may be determined based on the numerology information of the resource region, and the reference unit may be determined based on a predetermined numerology. In some embodiments, optionally, the terminal device 120 may further receive the numerology information of the resource region from the network device 110.

In some further alternative embodiments, the terminal device 120 may receive at least two of: a starting scheduling unit of the resource region; an ending scheduling unit of the resource region; and a number of scheduling units occupied by the resource region. In these embodiments, the scheduling unit may be determined based on the numerology information of the resource region. In some embodiments, optionally, the terminal device 120 may further receive the numerology information of the resource region from the network device 110.

Figure 7:
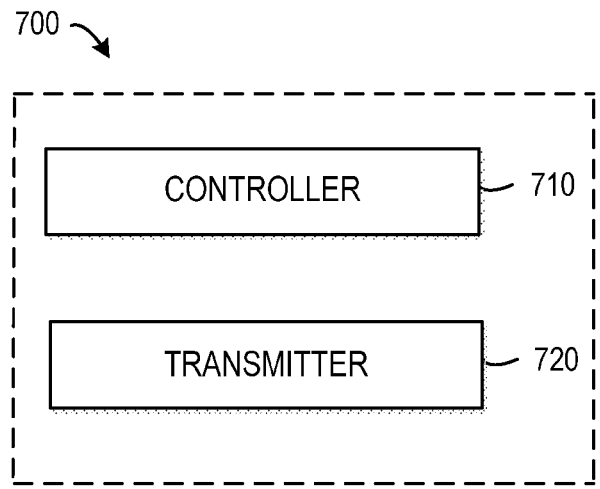
FIG. 7 illustrates a schematic diagram of a network device 700 according to an embodiment of the present disclosure.

FIG. 7 illustrates a schematic diagram of a network device 700 according to an embodiment of the present disclosure. According to embodiments of the present disclosure, the network device 700 may be implemented as the network device 110 or other suitable device in the communication system.

As shown in FIG. 7, the network device 700 comprises: a controller 710 configured to determine time information of a resource region based on numerology information of the resource region, the resource region being allocated for transmitting data to a terminal device; and a transmitter 720 configured to transmit the time information to the terminal device to enable the terminal device to receive the data on the resource region.

In some embodiments, the controller 710 may be further configured to: determine a scheduling unit based on a largest numerology used by one or more resource regions allocated by the network device; and determine the time information based on the scheduling unit.

In some embodiments, the controller 710 may be further configured to: determine a starting scheduling unit of the resource region as a starting position of the resource region; determine an ending scheduling unit of the resource region as an ending position of the resource region; and determine a number of scheduling units occupied by the resource region as a length of the resource region.

In some embodiments, the controller 710 may be further configured to: determine a scheduling unit based on the numerology information of the resource region; determine a reference unit based on a predetermined numerology; determine a first portion of the time information based on the reference unit; and determine a second portion of the time information based on the first portion of the time information, the reference unit and the scheduling unit.

In some embodiments, the controller 710 may be further configured to perform at least two of: determining a starting reference unit of the resource region as a first starting position of the resource region; determining an ending reference unit of the resource region as a first ending position of the resource region; and determining a number of reference units occupied by the resource region as a first length of the resource region.

In some embodiments, the controller 710 may be further configured to: determine a starting scheduling unit in the starting reference unit as a second starting position of the resource region; and determine an ending scheduling unit in the ending reference unit as a second ending position of the resource region.

In some embodiments, the controller 710 may be further configured to: determine a scheduling unit based on the numerology information of the resource region; and determine the time information based on the scheduling unit.

In some embodiments, the controller 710 may be further configured to perform at least two of: determining a starting scheduling unit of the resource region as a starting position of the resource region; determining an ending scheduling unit of the resource region as an ending position of the resource region; and determining a number of scheduling units occupied by the resource region as a length of the resource region.

In some embodiments, the transmitter 720 may be further configured to: transmit the numerology information of the resource region to the terminal device.

Figure 8:
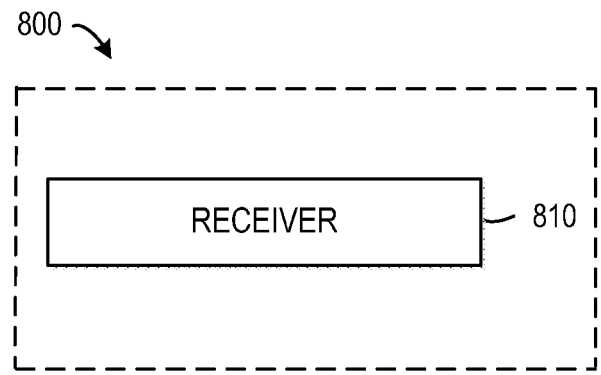
FIG. 8 illustrates a schematic diagram of a terminal device 800 according to an embodiment of the present disclosure.

FIG. 8 illustrates a schematic diagram of a terminal device 800 according to an embodiment of the present disclosure. According to embodiments of the present disclosure, the terminal device 800 may be implemented as the terminal device 120 or other suitable device in the communication system.

As shown in FIG. 8, the terminal device 800 comprises: a receiver 810 configured to receive time information of a resource region from a network device, the resource region being allocated for transmitting data to the terminal device, and the time information being determined based on numerology information of the resource region; and receive the data on the resource region based on the time information.

In some embodiments, the receiver 810 may be further configured to receive at least two of: a starting scheduling unit of the resource region, an ending scheduling unit of the resource region, and a number of scheduling units occupied by the resource region, wherein the scheduling unit is determined based on a largest numerology used by one or more resource regions allocated by the network device.

In some embodiments, the receiver 810 may be further configured to receive a first portion of the time information, wherein the first portion of the time information includes at least two of: a starting reference unit of the resource region, an ending reference unit of the resource region, and a number of reference units occupied by the resource region; and receive a second portion of the time information, wherein the second portion of the time information includes a starting scheduling unit and an ending scheduling unit, wherein the scheduling unit is determined based on the numerology information of the resource region, and the reference unit is determined based on a predetermined numerology.

In some embodiments, the receiver 810 may be further configured to receive at least two of: a starting scheduling unit of the resource region; an ending scheduling unit of the resource region; and a number of scheduling units occupied by the resource region, wherein the scheduling unit is determined based on the numerology information of the resource region.

In some embodiments, the receiver 810 may be further configured to receive the numerology information of the resource region from the network device.

It is also to be noted that the device 700 or 800 may be respectively implemented by any suitable technique either known at present or developed in the future. Further, a single device shown in FIG. 7 or 8 may be alternatively implemented in multiple devices separately, and multiple separated devices may be implemented in a single device. The scope of the present disclosure is not limited in these regards.

It is noted that the device 700 or 800 may be configured to implement functionalities as described with reference to FIG. 2 or FIG. 6. Therefore, the features discussed with respect to the method 200 may apply to the corresponding components of the device 700, and the features discussed with respect to the method 600 may apply to the corresponding components of the device 800. It is further noted that the components of the device 700 or 800 may be embodied in hardware, software, firmware, and/or any combination thereof. For example, the components of the device 700 or 800 may be respectively implemented by a circuit, a processor or any other appropriate device. Those skilled in the art will appreciate that the aforesaid examples are only for illustration not limitation.

In some embodiment of the present disclosure, the device 700 or 800 may comprise at least one processor. The at least one processor suitable for use with embodiments of the present disclosure may include, by way of example, both general and special purpose processors already known or developed in the future. The device 700 or 800 may further comprise at least one memory. The at least one memory may include, for example, semiconductor memory devices, e.g., RAM, ROM, EPROM, EEPROM, and flash memory devices. The at least one memory may be used to store program of computer executable instructions. The program can be written in any high-level and/or low-level compliable or interpretable programming languages. In accordance with embodiments, the computer executable instructions may be configured, with the at least one processor, to cause the device 700 to at least perform according to the method 200 as discussed above and to cause the device 800 to at least perform according to the method 600 as discussed above.

Based on the above description, the skilled in the art would appreciate that the present disclosure may be embodied in an apparatus, a method, or a computer program product. In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flowcharts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The various blocks shown in FIG. 2 or 6 may be viewed as method steps, and/or as operations that result from operation of computer program code, and/or as a plurality of coupled logic circuit elements constructed to carry out the associated function(s). At least some aspects of the exemplary embodiments of the disclosures may be practiced in various components such as integrated circuit chips and modules, and that the exemplary embodiments of this disclosure may be realized in an apparatus that is embodied as an integrated circuit, FPGA or ASIC that is configurable to operate in accordance with the exemplary embodiments of the present disclosure.

While this specification contains many specific implementation details, these should not be construed as limitations on the scope of any disclosure or of what may be claimed, but rather as descriptions of features that may be specific to particular embodiments of particular disclosures. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Various modifications, adaptations to the foregoing exemplary embodiments of this disclosure may become apparent to those skilled in the relevant arts in view of the foregoing description, when read in conjunction with the accompanying drawings. Any and all modifications will still fall within the scope of the non-limiting and exemplary embodiments of this disclosure. Furthermore, other embodiments of the disclosures set forth herein will come to mind to one skilled in the art to which these embodiments of the disclosure pertain having the benefit of the teachings presented in the foregoing descriptions and the associated drawings.

Therefore, it is to be understood that the embodiments of the disclosure are not to be limited to the specific embodiments disclosed and that modifications and other embodiments are intended to be included within the scope of the appended claims. Although specific terms are used herein, they are used in a generic and descriptive sense only and not for purpose of limitation.

What is claimed is:

1. A method performed by a network device, comprising:
transmitting, to a terminal device, information of a resource for a data transmission,
wherein the information is determined based on a first resource unit and a second resource unit,
wherein the first resource unit is different from the second resource unit, the first resource unit is associated with a first subcarrier spacing and the second resource unit is with a second subcarrier spacing which is different from the first subcarrier spacing; and
transmitting the data transmission based on the information,
wherein a length of the information is used by the terminal device to determine the resource.

2. The method of claim 1 further comprising:
transmitting a first numerology information of the first resource unit and a second numerology information of the second resource unit.

3. A method performed by a terminal device, comprising:
receiving, from a network device, information of a resource for a data transmission;
determining, based on the information, a first resource unit and a second resource unit,
wherein the first resource unit is different from the second resource unit, the first resource unit is associated with a first subcarrier spacing and the second resource unit is associated with a second subcarrier spacing which is different from the first subcarrier spacing; and
receiving the data transmission based on the information,
wherein the resource for the data transmission is determined based on a length of the information.

4. The method of claim 3, wherein the information comprises a first information and a second information, the first information is determined based on the first resource unit and the second information is determined based on the second resource unit.

5. The method of claim 3 further comprising:
receiving the information in a first resource region, wherein the first resource region is determined based on the first resource unit; and
receiving the data transmission in a second resource region, wherein the second resource region is determined based on the second resource unit.

6. The method of claim 5 further comprising: receiving a first numerology information of the first resource unit and a second numerology information of the second resource unit.

7. A terminal device comprising:
   at least one processor configured to control the terminal device to:
   receive, from a network device, information of a resource for a data transmission;
   determine a first resource unit and a second resource unit for the data transmission,
   wherein the first resource unit is different from the second resource unit, the first resource unit is associated with a first subcarrier spacing and the second resource unit is associated with a second subcarrier spacing which is different from the first subcarrier spacing; and
   receive the data transmission based on the information, wherein the resource for the data transmission is determined based on a length of the information.

* * * * *